United States Patent
Leone et al.

(10) Patent No.: US 9,284,920 B2
(45) Date of Patent: Mar. 15, 2016

(54) SYSTEMS AND METHODS FOR STOPPING AND STARTING AN ENGINE WITH DEDICATED EGR

(71) Applicant: Ford Global Technologies, LLC, Dearborn, MI (US)

(72) Inventors: Thomas G. Leone, Ypsilanti, MI (US); Chris Paul Glugla, Macomb, MI (US); James Alfred Hilditch, Canton, MI (US); Michael Damian Czekala, Canton, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/309,089

(22) Filed: Jun. 19, 2014

(65) Prior Publication Data

US 2015/0369180 A1 Dec. 24, 2015

(51) Int. Cl.
| | |
|---|---|
| *F02B 75/18* | (2006.01) |
| *F02M 25/07* | (2006.01) |
| *F02N 11/08* | (2006.01) |
| *F02D 17/02* | (2006.01) |
| *F02B 75/02* | (2006.01) |
| *F02F 1/24* | (2006.01) |
| *F02B 75/22* | (2006.01) |
| *F02B 61/02* | (2006.01) |

(52) U.S. Cl.
CPC .......... *F02M 25/0749* (2013.01); *F02D 17/02* (2013.01); *F02N 11/0803* (2013.01); *F02B 61/02* (2013.01); *F02B 75/22* (2013.01); *F02B 2075/027* (2013.01); *F02B 2075/1808* (2013.01); *F02F 2001/245* (2013.01)

(58) Field of Classification Search
CPC .... F02B 2075/027; F02B 61/02; F02B 75/22; F02B 2075/1808; F02F 2001/245
USPC .......................................... 123/52.1
See application file for complete search history.

(56) References Cited

U.S. PATENT DOCUMENTS

| | | | |
|---|---|---|---|
| 5,746,189 | A | 5/1998 | Kuzuya et al. |
| 6,053,154 | A | 4/2000 | Pott |
| 6,138,650 | A | 10/2000 | Bailey |
| 6,230,695 | B1 | 5/2001 | Coleman et al. |
| 6,925,802 | B2 | 8/2005 | Arnold |

(Continued)

FOREIGN PATENT DOCUMENTS

| | | |
|---|---|---|
| WO | 2013175091 A1 | 11/2013 |
| WO | 2014005127 A2 | 1/2014 |

OTHER PUBLICATIONS

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

(Continued)

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

Methods and systems are provided for operating an engine including a DEGR system during start-stop and DFSO conditions. In one example, the DEGR cylinder may be deactivated prior to deactivating the non-DEGR cylinder group and stopping the engine, to purge EGR from the intake system.

21 Claims, 9 Drawing Sheets

(56) References Cited

U.S. PATENT DOCUMENTS

| | | |
|---|---|---|
| 8,291,891 B2 | 10/2012 | Alger, II et al. |
| 2002/0165659 A1* | 11/2002 | Boggs et al. ............... 701/112 |
| 2005/0016496 A1 | 1/2005 | Hitomi et al. |
| 2009/0308070 A1 | 12/2009 | Alger, II et al. |
| 2012/0204844 A1 | 8/2012 | Gingrich et al. |
| 2012/0260897 A1 | 10/2012 | Hayman et al. |
| 2013/0127077 A1 | 5/2013 | Qiu |

OTHER PUBLICATIONS

Alger, Terry et al., "Dedicated EGR: A New Concept in High Efficiency Engines," SAE Technical Paper Series No. 2009-01-0694, Southwest Research Institute, 12 pages.

Boyer, Brad A. et al., "Devices and Methods for Exhaust Gas Recirculation Operation of an Engine," U.S. Appl. No. 13/744,281, filed Jan. 17, 2013, 33 pages.

Ulrey, Joseph N. et al., "Dedicated EGR Cylinder Post Combustion Injection," U.S. Appl. No. 13/915,445, filed Jun. 11, 2013, 34 pages.

Pohlkamp, Kyle et al., "EGR Operation Method and System for Increased Drivability," U.S. Appl. No. 14/252,595, filed Apr. 4, 2014, 43 pages.

Leone, Thomas G. et al., "Systems and Methods for Dedicated EGR Cylinder Valve Control," U.S. Appl. No. 14/297,232, filed Jun. 5, 2014, 36 pages.

Leone, Thomas G. et al., "Systems and Methods for EGR Control," U.S. Appl. No. 14/298,733, filed Jun. 6, 2014, 45 pages.

* cited by examiner

SYSTEMS AND METHODS FOR STOPPING AND STARTING AN ENGINE WITH DEDICATED EGR

FIELD

The present description relates to systems and methods for improving purging of exhaust gas recirculation (EGR) from the intake manifold during stop-start and/or deceleration fuel shut off (DFSO) operations. The methods may be particularly useful for engines that include a cylinder or cylinder group that provides external EGR to other engine cylinders.

BACKGROUND AND SUMMARY

Engines may be configured with exhaust gas recirculation (EGR) systems to recirculate a portion of exhaust gas from an engine exhaust to an engine intake system. By providing a desired engine dilution, such systems reduce combustion temperatures and throttling losses. Consequently fuel economy and vehicle emissions are improved. Engines have also been configured with a sole cylinder (or cylinder group) that is dedicated for providing external EGR to other engine cylinders. Therein, all of the exhaust from the dedicated cylinder group is recirculated to the engine intake manifold. As such, this allows a substantially fixed amount of EGR to be provided to engine cylinders at most operating conditions.

Various approaches may be used to turn off EGR in such dedicated EGR systems during conditions when EGR is not required such as during transients such as start-stop and deceleration fuel shut off (DFSO) operations, for example. One example approach includes the use of diverter valves for diverting some or all of the exhaust from the dedicated EGR cylinder to an exhaust location. Another example approach, shown by Chapel et al. in WO 2013175091, inhibits combustion in the dedicated EGR cylinder by blocking fuel injection when an engine temperature is lower than a threshold temperature.

However, the inventors herein have recognized potential issues with the above approaches. As an example, valve actuators and fuel injection actuators require a duration of time to achieve a desired position. Consequently, EGR may not be turned off immediately. Further, even after the actuators have reached the desired position, there may be a delay in purging EGR from the engine intake. If the engine is shut down before EGR is purged from the intake manifold, there may be excess dilution of intake air with EGR during engine restart. The presence of excess intake air-EGR dilution may increase combustion instability issues and the propensity for engine misfires during engine restart.

In one example, the above issues may be at least partly addressed by a method for an engine comprising: deactivating a dedicated EGR cylinder group of a multi-cylinder engine in response to an imminent engine shutdown condition; monitoring an EGR amount after deactivating; and shutting down the engine in response to the monitored EGR amount falling below a threshold.

In this way, EGR may be purged from the intake before shutdown. The shutting down of the engine may include deactivating spark and/or fuel injection to all cylinders, for example.

As an example, an engine system may be configured with a single dedicated EGR (DEGR) cylinder for providing external EGR to all engine cylinders. During selected conditions when an engine shutdown is requested, detected, or anticipated, fueling to the DEGR cylinder may be stopped while operating the remaining non-DEGR cylinders with fueling. After EGR is purged from the intake manifold and/or the EGR system, intake and/or exhaust valves at the DEGR cylinder may be deactivated. Further, the non-DEGR cylinders may be deactivated (by stopping fueling and/or valve deactivation, for example) and the engine may be commanded to shut down and spin down to rest. Subsequently, during an engine restart operation from rest, the DEGR cylinder may be operated to combust only after the engine has completed cranking and a stable engine speed is established.

In one example, when a DFSO condition is detected, fueling to the DEGR cylinder may be stopped prior to stopping fueling to the non-DEGR cylinders (e.g., prior to entering DFSO). An intake EGR rate may be monitored upon stopping fueling to the DEGR cylinders. When the intake EGR rate decreases below a threshold rate, fueling to the non-DEGR cylinders may be stopped.

In this way, EGR may be purged from the intake manifold prior and/or the EGR system to shutting down the engine or prior to entering DFSO. By purging EGR, excess dilution of the intake air during subsequent engine restart or during resuming engine operation from DFSO may be reduced. As a result, robust and repeatable engine starts on an engine system with dedicated EGR may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
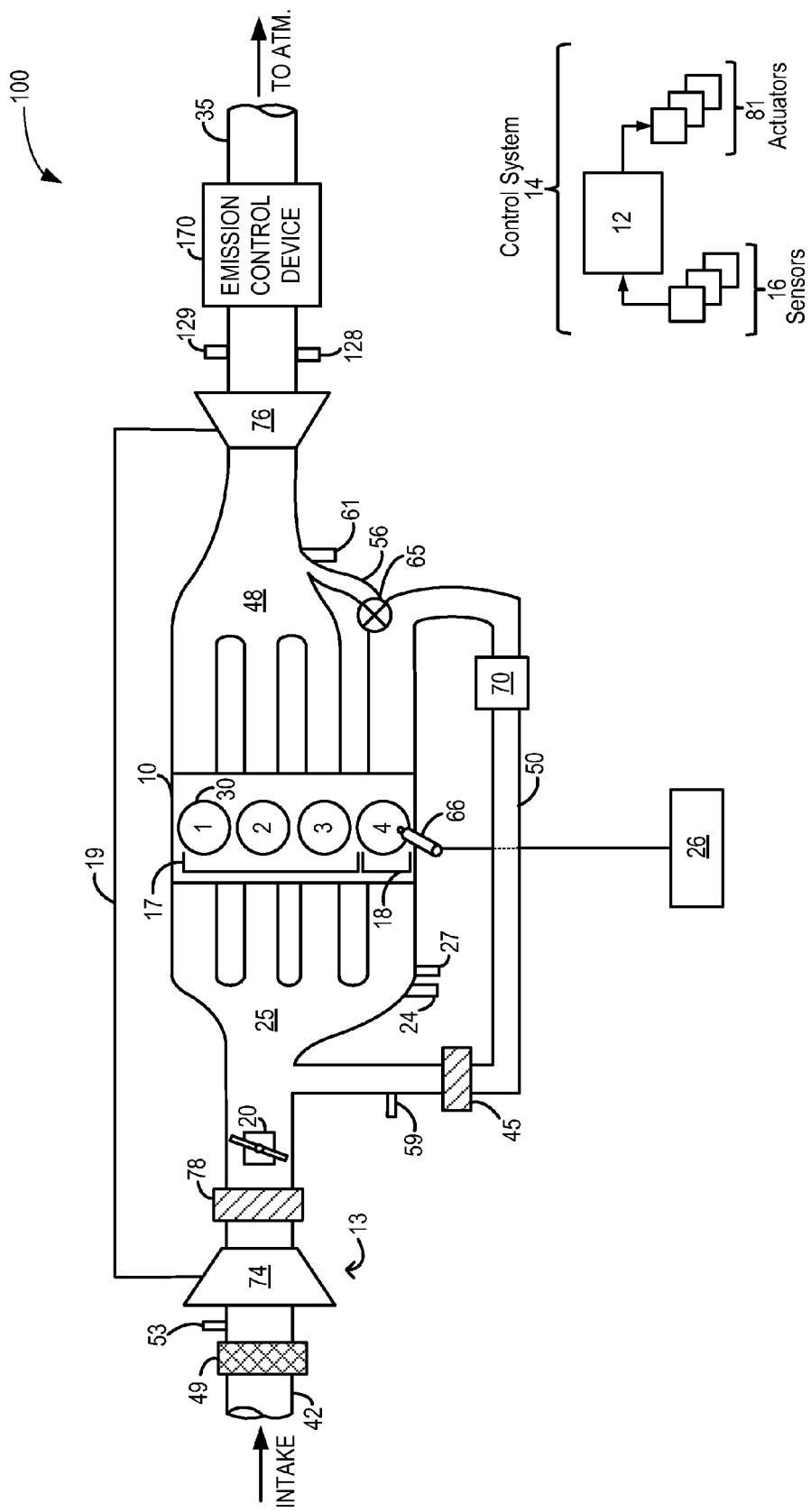
FIG. 1 is a schematic diagram of an engine system including a dedicated EGR donating cylinder group.
Figure 2:
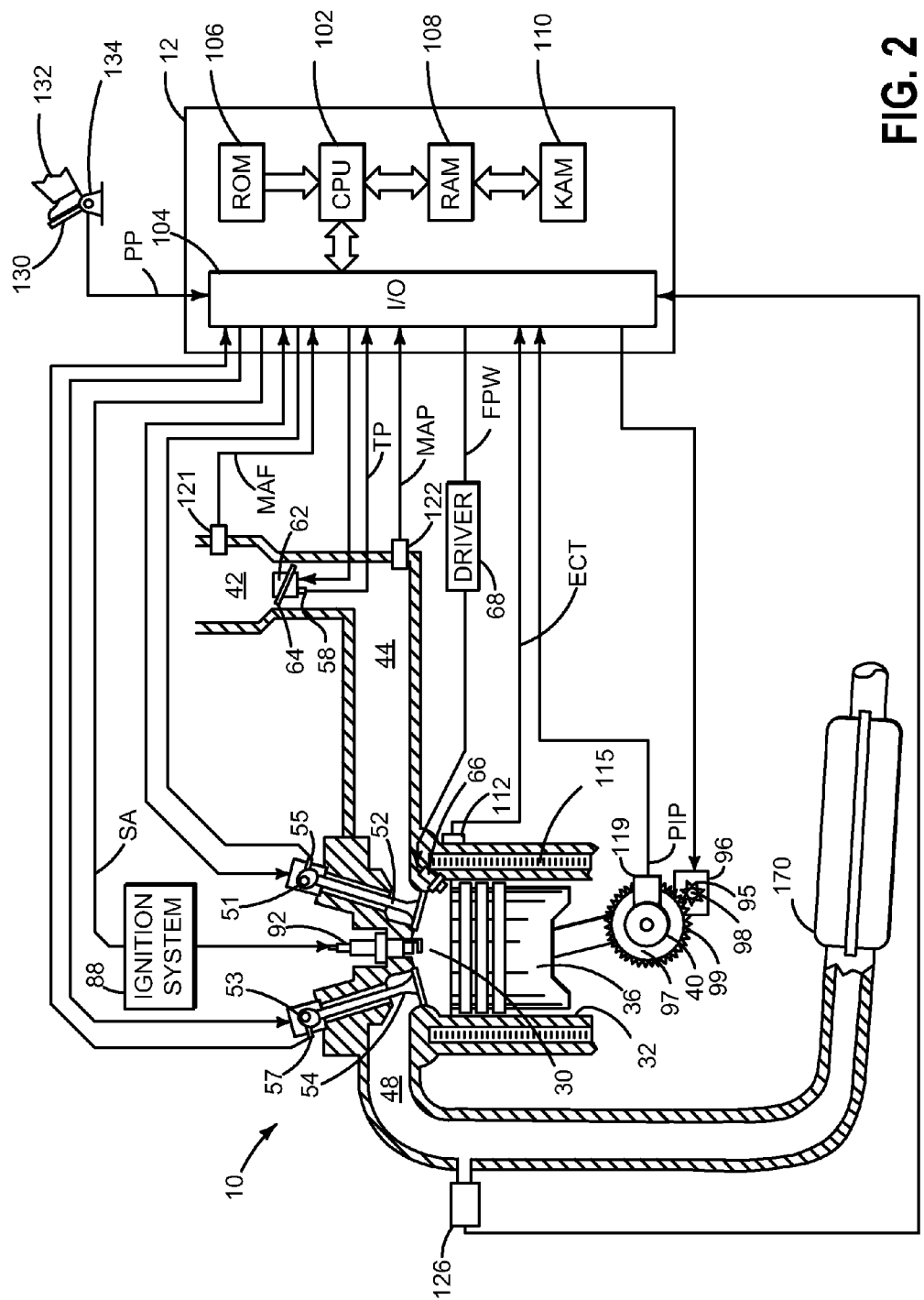
FIG. 2 is a schematic depiction of a combustion chamber of the engine system of FIG. 1.
Figure 3:
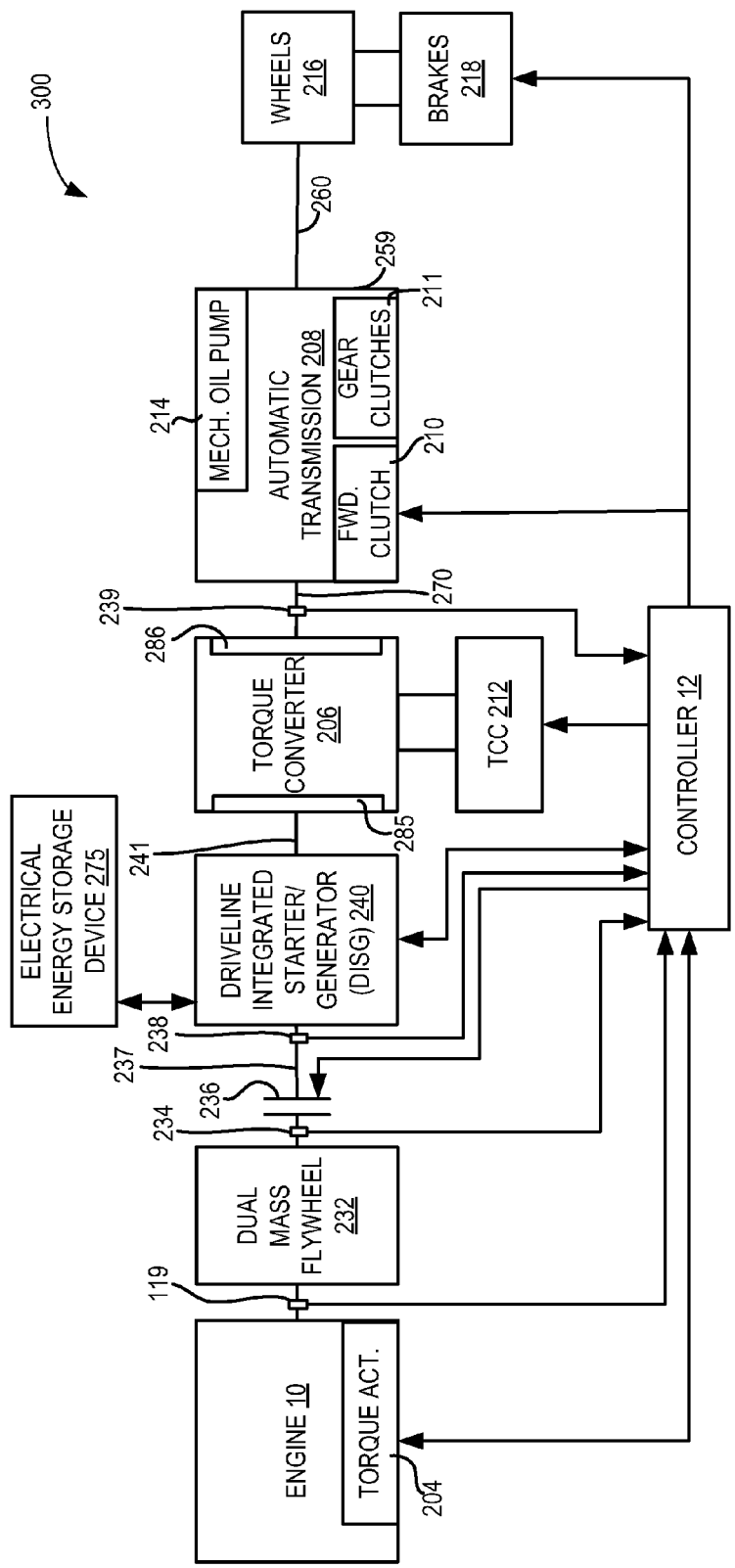
FIG. 3 shows an example vehicle driveline configuration.

The present description is related to methods and systems for stopping and starting an engine system including a dedicated EGR system, such as the engine system of FIG. 1. In one non-limiting example, the engine may be configured as illustrated in FIG. 2. Further, the engine may be part of a vehicle as illustrated in FIG. 3. A controller may be configured to perform a control routine, such as the routine of FIGS. 4-7 to purge EGR from an intake manifold of the engine prior to stopping the engine and prior to entering DFSO operations, and to restart the engine. Example engine operations, including operations of the DEGR cylinder and the non-DEGR cylinder during start-stop and DFSO operations, are shown with reference to FIGS. 8 and 9 respectively.

FIG. 1 schematically shows aspects an example engine system 100 including an engine 10 with four cylinders (1-4). As elaborated herein, the four cylinders are arranged as a first cylinder group 17 consisting of non-dedicated EGR cylinders 1-3 and a second cylinder group 18 consisting of dedicated EGR cylinder 4. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 49 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 27. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 2). The combustion chambers are further coupled to exhaust manifold 48 via a series of exhaust valves (see FIG. 2). In the depicted embodiment, exhaust manifold 48 includes a plurality of exhaust manifold sections to enable effluent from different combustion chambers to be directed to different locations in the engine system. In particular, effluent from the first cylinder group 17 (cylinders 1-3) is directed through turbine 76 of exhaust manifold 48 before being processed by an exhaust catalyst of emission control device 170. Exhaust from the second cylinder group 18 (cylinder 4), in comparison, is routed back to intake manifold 25 via passage 50, and exhaust catalyst 70. Alternatively, at least a portion of exhaust from the second cylinder group is directed to turbine 76 of exhaust manifold 48 via valve 65 and passage 56. By adjusting valve 65, a proportion of exhaust directed from cylinder 4 to the exhaust manifold relative to the intake manifold may be varied. In some examples, valve 65 and passage 56 may be omitted. In one example, valve 65 may be a three-way valve. In one example, valve 65 may be adjusted to allow all of the exhaust from cylinder 4 to exhaust manifold 48. In another example, valve 65 may be adjusted to allow all of the exhaust gas from cylinder 4 to intake manifold 25, while blocking any EGR flow to the exhaust manifold.

Exhaust catalyst 70 is configured as a water gas shift (WGS) catalyst. WGS catalyst 70 is configured to generate hydrogen gas from rich exhaust gas received in passage 50 from cylinder 4.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the second cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). Cylinders 1-3 are also referred to herein as a non-dedicated EGR cylinder group or non-dedicated EGR cylinders. While the current example shows the dedicated EGR cylinder group as having a single cylinder, it will be appreciated that in alternate engine configurations, the dedicated EGR cylinder group may have more engine cylinders.

EGR passage 50 may include an EGR cooler 45 for cooling EGR delivered to the engine intake. In addition, EGR passage 50 may include a first exhaust gas sensor 59 for estimating an air-fuel ratio of the exhaust recirculated from the second cylinder group to the remaining engine cylinders. A second exhaust gas sensor 61 may be positioned downstream of the exhaust manifold sections of the first cylinder group for estimating an air-fuel ratio of exhaust in the first cylinder group. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Additionally, a catalyst temperature may be adjusted in order to increase an efficiency of WGS catalyst 70. Thus, to provide hydrogen enriched exhaust to engine cylinders 1-4, fueling of the second cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from fuel tank 26. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 48 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. All or part of the treated exhaust from emission control device 170 may be released into the atmosphere via exhaust conduit 35.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 27, MAF sensor 47, exhaust gas temperature and pressure sensors 128 and 129, and oxygen sensors 24, and 61. Example actuators include throttle 20, fuel injector 66, dedicated cylinder group valve 65, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIG. 3.

Referring to FIG. 2, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bars. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 115; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 119 sensing crankshaft 40 position; a measurement of air mass entering the engine from sensor 121; and a measurement of throttle position from sensor 58. Barometric pressure may also be sensed (sensor not shown) for processing by controller 12. In a preferred aspect of the present description, engine position sensor 119 produces a predetermined number of equally spaced pulses for every revolution of the crankshaft, from which engine speed (RPM) can be determined.

In some examples, the engine may be coupled to an electric motor/battery system in a hybrid vehicle as shown in FIG. 3.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by ignition devices such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above description is merely an example, and that intake and exhaust valve opening and/or closing timings may vary, such as to provide positive or negative valve overlap, late intake valve closing, or various other examples.

FIG. 3 is a block diagram of a vehicle driveline 300. Driveline 300 may be powered by engine 10, which may correspond to engine 10 of FIGS. 1-2. Engine 10 may be started with an engine starting system such as that shown in FIG. 2, or via DISG 240. Further, engine 10 may generate or adjust torque via a torque actuator 204, such as a fuel injector, throttle, etc.

Engine output torque may be transmitted to an input side of dual mass flywheel 232. Engine speed, as well as dual mass flywheel input side position and speed, may be determined via engine position sensor 119. Dual mass flywheel 232 may include springs and separate masses (not shown) for dampening driveline torque disturbances. The output side of dual mass flywheel 232 is shown as being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 2. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to impeller 285 of torque converter 206 via shaft 241. The upstream side of DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch (TCC) 212. Torque is directly transferred from impeller 285 to turbine 286 when TCC 212 is locked. TCC 212 is electrically operated by controller 12. Alternatively, TCC 212 may be hydraulically locked. In one example, torque converter 206 may be referred to as a component of the transmission. Torque converter turbine speed and position may be determined via position sensor 239. In some examples, however, sensors 238 and/or 239 may be torque sensors, or combination position and torque sensors.

When TCC 212 is fully disengaged, torque converter 206 transmits engine torque to automatic transmission 208 via fluid transfer between the torque converter turbine 286 and torque converter impeller 285, thereby enabling torque multiplication. In contrast, when TCC 212 is fully engaged, engine output torque is directly transferred via TCC 212 to an input shaft 270 of transmission 208. Alternatively, TCC 212 may be partially engaged, thereby enabling the amount of torque directly relayed to the transmission to be adjusted. The controller 12 may be configured to adjust the amount of torque transmitted by torque converter 206 by adjusting TCC 212 in response to various engine operating conditions, or based on a driver-based engine operation request.

Automatic transmission 208 includes gear clutches 211 (e.g., for gears 1-6) and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may engage the wheel brakes. In the same way, a frictional force to wheels 216 may be reduced by disengaging wheel brakes 218 in response to the driver releasing his foot from a brake pedal. Further, the wheel brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or TCC 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 2, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from the DISG by adjusting current flowing to and from field and/or armature windings of the DISG as is known in the art.

Figure 4:
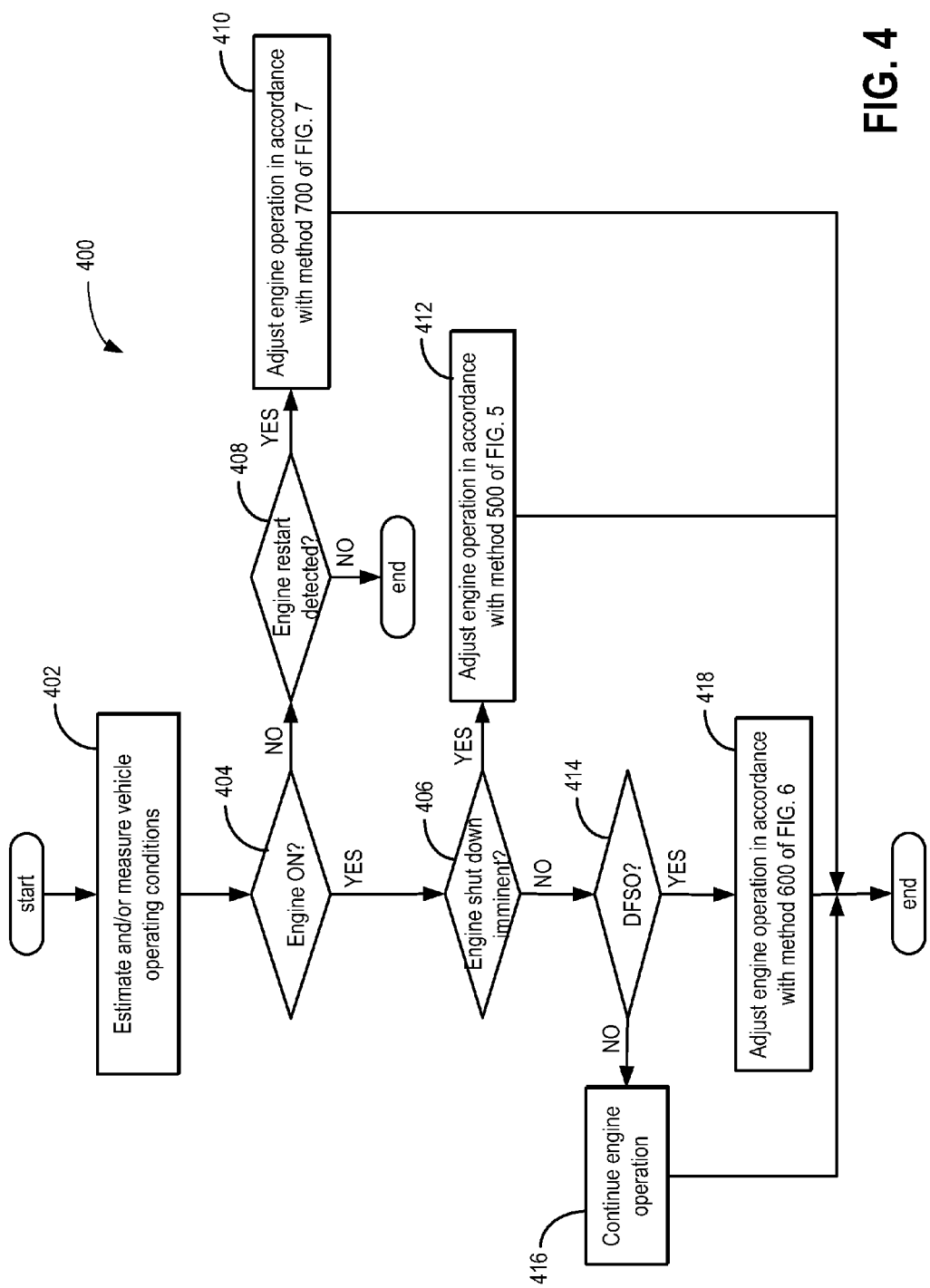
FIG. 4 shows a high level flow chart depicting an example method for adjusting engine operation to purge EGR in an intake manifold of the engine system of FIG. 1

Turning to FIG. 4, a method for adjusting engine operation to purge EGR in an intake manifold and/or the EGR system of an engine depending on a type of engine operation performed is provided. In one example, the type of engine operation may be a start-stop operation. In another example, the type of engine operation may be a DFSO operation. The method of FIG. 4 may be stored as executable instructions in non-transitory memory of controller 12 shown in FIGS. 1-3.

At 402, method 400 includes estimating and/or measuring vehicle operating conditions. Vehicle operating conditions may include but are not limited to engine speed, accelerator position, throttle position, brake pedal position, vehicle speed, engine temperature, and load. Method 400 proceeds to 404 after determining vehicle operating conditions. At 404, method 400 may determine if the engine is ON. The engine may be determined to be ON if the engine speed is greater than zero, for example. In one example, engine speed may be greater than zero when engine is rotating as a result of combustion in one or more cylinders of the engine. As such, for combustion to take place, air/fuel mixture may be injected into a combustion chamber of the cylinder(s) and ignited. In some examples, engine speed may be greater than zero during conditions of deceleration fuel shut-off, such as, when the vehicle is travelling downhill. In this case, torque from the moving wheels may be used to spin the engine.

If at 404, it is determined that the engine is ON, the method may proceed to 406. At 406, method 400 may determine if engine shut down is imminent. For example, the engine may be shut down, to zero speed to reduce fuel consumption when the operator releases an accelerator pedal and applies a brake pedal. Accordingly, the engine is shut down when the vehicle is coming to a stop, or at other times when the torque from the motor is sufficient to accelerate the vehicle or overcome the road load. The engine may also be shut down after the vehicle comes to a stop. Engine shut down conditions may be based on accelerator pedal position, brake pedal position, engine speed, vehicle speed, ambient temperature, engine temperature, battery state of charge, etc. In one example, upon detecting a traffic control device such as red traffic light, or a stop sign, the vehicle operator may apply the brake pedal to stop the vehicle. As a result, the engine speed may decrease below a threshold speed. Accordingly, based on the engine speed below a threshold speed, an accelerator pedal position, and a brake pedal position, it may be determined that an engine shut down is imminent. Upon determining that engine shut down is imminent, the method may proceed to 412, at which the engine may be operated in accordance with method 500 of FIG. 5 as detailed below to purge EGR in the intake manifold before the engine is shut-down.

Returning to 406, if is determined that engine shut-down is not expected, the controller may determine if DFSO conditions are present. DFSO conditions may be determined based on a change in vehicle speed over time, a change in engine speed over time, a brake pedal position, an accelerator pedal position, and a lack of driver demanded torque. In one example, DFSO conditions may include a tip-out (that is, when the operator has released the accelerator pedal and requested a decrease in torque). In another example, DFSO conditions may include a change in vehicle speed over time greater than a threshold change and a lack of driver demanded torque (such as when the vehicle is travelling downhill). If DFSO conditions are present, the controller may adjust engine operation in accordance with method 600 of FIG. 6 as detailed below to purge EGR in the intake manifold before shutting off fuel to non-DEGR cylinders. If DFSO conditions are not detected, the method may proceed to 416. At 416, engine may be operated according to current speed and load conditions.

Returning to 404, if it is determined that engine is not operating, the method 400 may proceed to 408 to determine if engine restart conditions are detected. Engine restart conditions may be determined based on accelerator pedal position, brake pedal position, engine speed, vehicle speed, ambient temperature, engine temperature, battery state of charge, etc. For example, when the operator applies the accelerator pedal and the desired torque exceeds that which the motor can provide, the engine may be restarted to supplement the motor output torque. In addition, the engine may be restarted during a coasting condition if the battery state of charge drops below a minimum threshold, where the engine is restarted and provides torque to operate the motor as a generator to recharge the battery. In one example, engine restart conditions may be additionally based on change in status of a traffic control device (such as a change in traffic light to a green traffic light). If engine restart conditions are detected at 408, method 400 may proceed at step 410 to adjust engine operation in accordance with method 700 of FIG. 7 to improve engine restart.

In this way, engine operation may be adjusted during start-stop and DFSO operating conditions to purge EGR in the intake manifold and/or the EGR system. By purging EGR prior to stopping the engine and prior to entering DFSO, excess intake air dilution during engine restart and reactivation from DFSO may be reduced. As a result, combustion stability may be improved.

In one example, a method for operating an engine may comprise, during a first condition deactivating a dedicated EGR cylinder and deactivating each of remaining cylinders after a first duration after deactivating the dedicated EGR cylinder; and during a second condition stopping fuel to the dedicated EGR cylinder and stopping fuel to each of remaining cylinders after a second duration after stopping fuel to the dedicated EGR cylinder. The first duration and the second duration may be based on an engine speed, an engine load, and an initial EGR rate. In one example, the second duration may be longer than the first duration. Further, the first condition may be an engine shutdown condition, and the second condition may be a DFSO condition.

Figure 5:
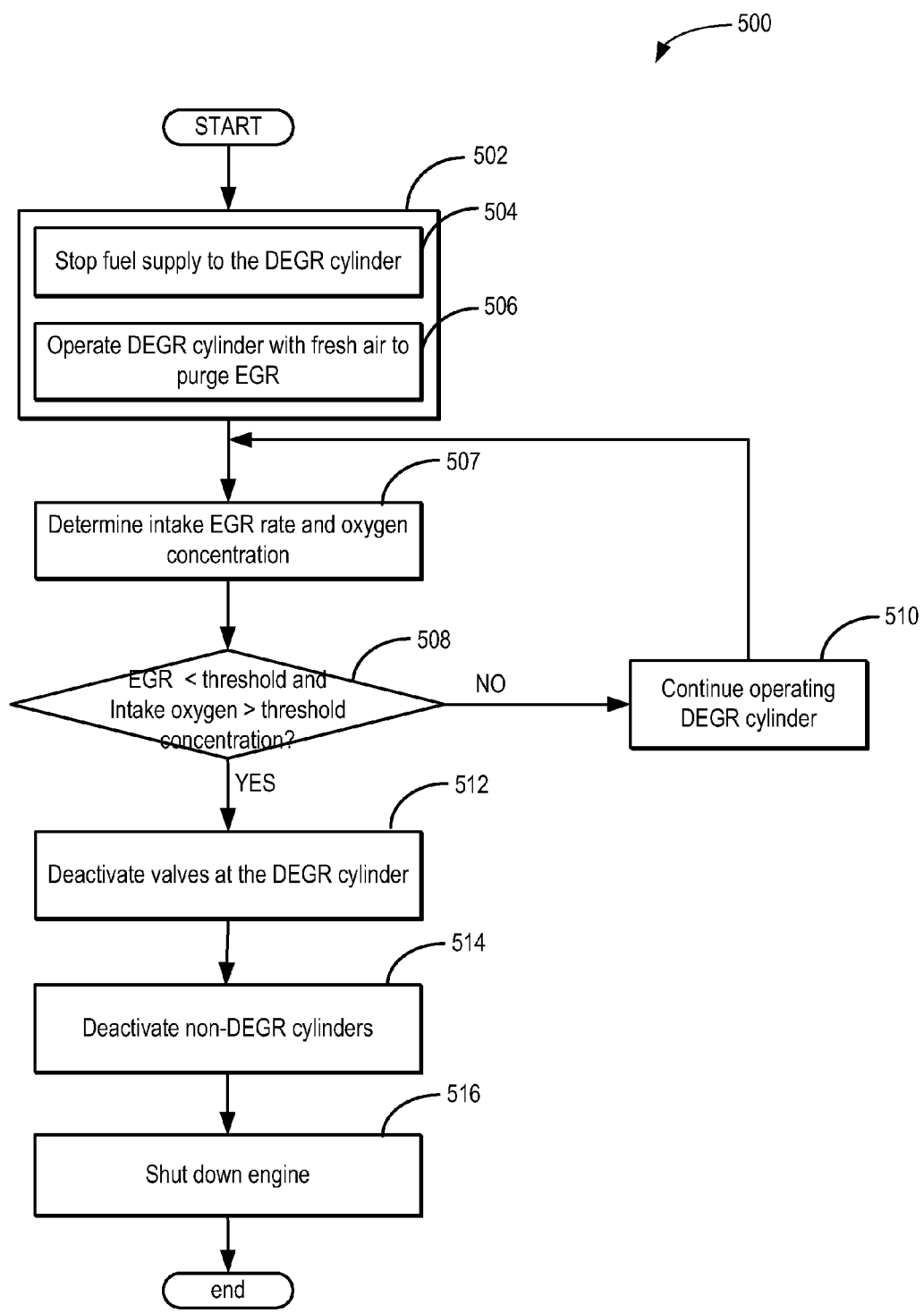
FIG. 5 shows an example method for adjusting engine operation to purge EGR in the intake manifold when an engine shut down operation is anticipated, to be used in conjunction with the method of FIG. 4.

Turning now to FIG. 5, it shows an example method 500 for adjusting engine operation when an engine shut down operation is anticipated. For example, method 500 may be performed at step 412 of method 400. The method of FIG. 5 may be stored as executable instructions in non-transitory memory of controller 12 shown in FIGS. 1-3. Engine shut down may be anticipated based on engine speed below a threshold speed, a vehicle speed below a threshold speed, an accelerator pedal position, a brake pedal position, an engine temperature, a battery state of charge, etc. In one example, engine may be shut down when the vehicle is stopped in response to a signal from a traffic control device such as a stop light or a stop sign. Method 500 of FIG. 5 may be performed to purge EGR from the intake manifold when conditions for engine shut down are detected.

At 502, upon determining that engine shut down is imminent, the method includes at 504 stopping fuel supply to a DEGR cylinder. For example, the controller may signal a fuel injector actuator to move to a desired position in order to stop fuel supply to the DEGR cylinder. Accordingly, the fuel injector actuator may move to the desired position, and fuel supply to the DEGR cylinder may be stopped. Further, method 500 includes at 506, operating the DEGR cylinder in the absence of fuel. When the DEGR cylinder is operated after stopping fuel to the DEGR cylinder, fresh air supplied to the intake through an intake throttle may be pumped through the DEGR cylinder. The fresh air and EGR in the EGR system may displace EGR in the intake manifold. Subsequently, EGR may be purged from the intake system. As a result, an EGR rate in the intake system may decrease and an intake oxygen concentration may increase. The EGR rate may be a ratio of EGR mass to total intake mass (air plus EGR).

Next, after stopping fuel to the DEGR cylinder, method 500 may proceed to 507. At 507, an intake EGR rate and an intake oxygen concentration may be determined. The intake oxygen concentration may be measured utilizing an intake oxygen sensor, such as oxygen sensor 24. The EGR rate in the intake manifold may be determined based on the intake oxygen concentration and manifold pressure and temperature, and/or based on mass airflow and engine speed. Next, at 508, the controller may determine if the EGR rate is less than a threshold rate, (another example approach may determine if the intake oxygen concentration is greater than a threshold concentration in the intake manifold in order to determine if the EGR rate is less than a threshold rate). When EGR is substantially purged from the intake system, the EGR rate may be below the threshold rate and the concentration of oxygen in the intake system may be greater than the threshold concentration. Upon determining that EGR is substantially purged from the intake system, at 512, the controller may deactivate the intake and/or exhaust valves at the DEGR cylinder to fully deactivate the DEGR cylinder. Alternatively, dedicated cylinder group valve 65 may be actuated to prevent DEGR flow during a subsequent engine restart.

Next, at 514, the controller may deactivate each of the remaining non-DEGR cylinders. The non-DEGR cylinders may be deactivated by stopping fuel and spark to the non-DEGR cylinders. Further, intake and/or exhaust valve deactivation may be employed to deactivate the non-DEGR cylinders. Upon deactivating the non-DEGR cylinders, the controller may proceed to 516. At 516, engine may be shut down. For example, the engine may be shut down by decoupling the engine from the transmission. In one example, the intake and/or exhaust valves of the DEGR and the non-DEGR cylinders may not be deactivated. In the absence of valve deactivation, after stopping fuel to the DEGR cylinders, a throttle position may be adjusted to compensate for the torque loss from stopping fuel to the DEGR cylinders.

Returning to 508, if the EGR rate is not less than the threshold rate (in another example approach if the intake oxygen concentration is not greater than a threshold concentration in the intake manifold), the routine may proceed to step 510. At 510, the controller may continue operation of the DEGR cylinder unfueled to pump more air to purge existing EGR until the EGR rate is less than the threshold rate or the intake oxygen concentration is greater than the threshold concentration.

In this way, during conditions when engine shut down is imminent, the DEGR cylinder may be deactivated. Subsequently, upon determining that EGR is purged from the intake manifold, the non-DEGR cylinders may be deactivated and the engine may be stopped.

In one example, when engine shut down conditions are imminent, a position of the fuel injector actuator supplying fuel to the DEGR cylinder may be monitored. Upon the fuel injector actuator reaching a desired position to stop fuel to the DEGR cylinder, a counter may be initiated. The counter may be incremented based on one or more of a duration after the injector actuator has reached a desired position, number of engine revolutions, and intake air flow. Upon the counter increasing greater than a threshold value, the non-DEGR cylinders may be deactivated. In this way, the counter may be utilized to allow sufficient time for EGR to be purged from the intake manifold before stopping the engine.

In another example, during start-stop operation, upon stopping fuel and spark to the DEGR cylinders, the intake throttle may be adjusted to wide open throttle to purge the manifold of EGR. The duration of maintaining the throttle in the wide open position may be based on an intake manifold volume.

In another example, a method for operating an engine may comprise deactivating a dedicated EGR cylinder group of a multi-cylinder engine in response to an imminent engine shutdown condition; monitoring an intake oxygen amount after deactivating; and shutting down the engine in response to the monitored intake oxygen falling above a threshold, wherein shutting down the engine includes stopping spark. The method may include deactivating each of remaining engine cylinders in response to the monitored oxygen above the threshold concentration, and may further include, in response to an engine restart, reactivating one or more of the remaining engine cylinders, while not reactivating the dedicated EGR cylinder group. Still further, the dedicated EGR cylinder group may be reactivated after the engine restart when an engine speed has reached an idle speed. Deactivating the dedicated EGR cylinder group may include stopping fuel to the dedicated EGR cylinder group and deactivating one or more of an intake valve and an exhaust valve of the dedicated EGR cylinder group. Stopping fuel to the dedicated EGR cylinder group may be performed before deactivating the one or more valves of the dedicated EGR cylinder group. Deactivating each of the remaining engine cylinders may include stopping fuel to each of the remaining engine cylinders and additionally may include deactivating one or more of an intake valve and an exhaust valve of each of the remaining engine cylinders.

Further, the intake oxygen may be determined based on an intake oxygen sensor measurement. The engine shutdown condition may be based on one or more of an accelerator pedal position, a brake pedal position, an engine speed, engine temperature, and battery state of charge, and further based on an engine speed below a threshold speed.

Figure 6:
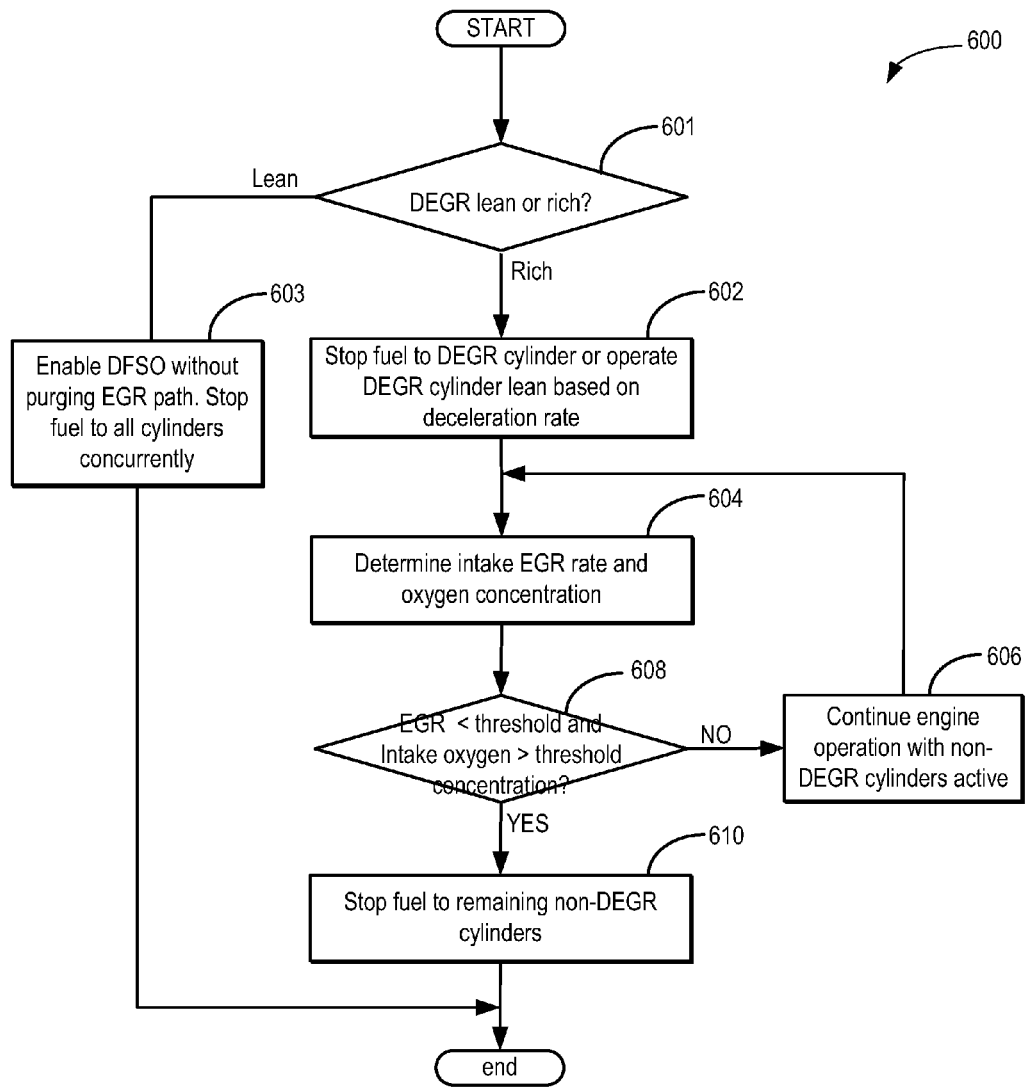
FIG. 6 shows an example method for adjusting engine operation to purge EGR in the intake manifold during DFSO conditions, to be used in conjunction with the method of FIG. 4.

FIG. 6 shows an example method 600 for adjusting engine operation during DFSO conditions. For example, method 600 may be performed at step 414 of method 400 upon determining DFSO conditions. The method of FIG. 6 may be stored as executable instructions in non-transitory memory of controller 12 shown in FIGS. 1-3.

At 601, method 600 includes determining if the DEGR cylinders are operated rich or lean. If the DEGR cylinder is operated rich, the method may proceed to 602. At 602, method 600 includes stopping fuel and spark to the DEGR cylinder while continuing operation of the non-DEGR cylinders with fuel supply and spark. Fuel to the DEGR cylinders may be stopped by deactivating the fuel injector to the DEGR cylinders, for example. In one example, in addition to stopping fuel and spark to the DEGR cylinders, the intake and/or exhaust valves of the DEGR cylinders may be deactivated. In another example, fuel and spark to the DEGR cylinders may be stopped without valve deactivation. In this case, when valve deactivation is not coupled with stopping fuel and spark (at the DEGR cylinders), an intake throttle position may be adjusted to an open position, a degree of opening based on a torque demand. For example, when fuel to the DEGR cylinders is stopped, the non-DEGR cylinders may be operated with a higher cylinder air charge in order to compensate for the torque reduction due to stopping fuel to the DEGR cylinders.

Upon stopping fuel to the DEGR cylinders, the method may proceed to 604. In some examples, prior to stopping fuel to the DEGR cylinders, the DEGR cylinders may be operated lean in order to reduce the amount of rich mixture (from the intake) pumped through the exhaust and the exhaust catalyst. The decision to stop fuel to the DEGR cylinders or operate the DEGR cylinder lean may be based on a deceleration rate, for example.

Returning to 601, if the DEGR cylinder is operated lean, the method may proceed to 603. At 603, the method may include enabling DFSO without purging the EGR path. Enabling DFSO may include stopping fuel to all the cylinders (that is, the DEGR cylinders and the non-DEGR cylinders) concurrently. After enabling DFSO, the method may end.

Next, returning to 604, upon stopping fuel to the DEGR cylinders (at 602); method 600 includes determining oxygen concentration and EGR rate in the intake manifold. Oxygen concentration and EGR rate may be determined based on measurements from an intake oxygen sensor, such as intake oxygen sensor 24 at FIG. 1, for example. Upon determining oxygen concentration and EGR rate at the intake manifold, the method may proceed at 608 to determine if EGR rate is less than a threshold rate. Another example approach may determine if the intake oxygen concentration is greater than a threshold concentration in order to determine if the EGR rate is less than a threshold rate. If yes, method 600 may proceed to 610. When fuel supply to the DEGR cylinders is stopped, air may be pumped through the DEGR cylinders. Since all of exhaust from the DEGR cylinders is recirculated to the intake manifold, when fuel to the DEGR cylinders is stopped, un-combusted air and EGR in the EGR system may be recirculated to the intake manifold. Since fueling to the DEGR cylinders is stopped, no additional EGR may be recirculated. Eventually, the recirculated un-combusted air may replace most of the exhaust gas in the intake manifold, thereby purging EGR from the intake manifold. In this way, upon determining DFSO conditions, fuel supply to the DEGR cylinders may be stopped to purge EGR present in the intake manifold. When EGR is substantially purged, the EGR rate may be less than the threshold rate and intake oxygen concentration may be greater than the threshold concentration. In other words, the exhaust gas in the intake manifold may be replaced with un-combusted air.

At 610, upon determining that EGR is purged from the intake manifold, fuel to the remaining non-DEGR cylinders may be stopped. In one example, fuel to the non-DEGR cylinders may be stopped when a number of engine revolutions after fuel shut-off to the DEGR cylinder increases more than a threshold number of engine revolutions. The threshold number of engine revolutions may be based on engine speed, load, and initial EGR rate, for example. In another example, fuel to the non-DEGR cylinders may be stopped when a duration of time after fuel shut-off to the DEGR cylinder is greater than a threshold duration, the threshold duration based on engine speed, load, and initial EGR rate.

In one example, upon determining that EGR is purged from the intake manifold, fuel and spark to at least one non-DEGR cylinder may be stopped. Further, valves may be deactivated at the non-DEGR cylinders to which fuel and spark has been stopped. The number of non-DEGR cylinders to which the fuel supply may be stopped may be determined based on engine speed, and load, for example. Returning to 608, if it is determined that the EGR rate is not less than the threshold rate (in another example approach, if intake oxygen concentration is not greater than the threshold percentage); method 600 may proceed to 606. At 606, engine may be operated with fuel supply stopped to DEGR cylinders. However, the non-DEGR cylinders may operate with fuel until EGR is purged from the intake manifold. That is, upon stopping fuel to the DEGR cylinders, fuel to the non-DEGR cylinders may be stopped only when it is determined that the EGR in the intake manifold is less than the threshold rate and the oxygen concentration in the intake manifold is greater than the threshold concentration.

In one example, based on the amount of EGR remaining in the intake manifold, the number of non-DEGR cylinders to which fuel may be shut-off after shutting off fuel to the DEGR cylinders may vary. For example, when EGR in the intake manifold after fuel shut-off to the DEGR cylinders is below a first threshold rate and above a second threshold rate, fuel to a first number of non-DEGR cylinders may be shut off. When EGR in the intake manifold after fuel shut-off to the DEGR cylinders is below the second threshold rate, fuel to a second number of non-DEGR cylinders may be shut-off. The first threshold rate may be greater than the second threshold rate, and the first number of DEGR cylinders may be less than the second number of DEGR cylinders.

In another example, during DFSO conditions, a position of the fuel injector actuator supplying fuel to the DEGR cylinder may be monitored. Upon the fuel injector actuator reaching a desired position to stop fuel to the DEGR cylinder, a counter may be initiated. The counter may be incremented based on one or more of a duration after the injector actuator has reached a desired position, a number of engine revolutions after the injector actuator has reached a desired position, and an intake air flow. Upon the counter increasing greater than a threshold value, fueling to the non-DEGR cylinders may be stopped. In this way, the counter may be utilized to allow sufficient time for EGR to be purged from the intake manifold before DFSO is initiated.

In this way, DEGR and non-DEGR cylinders may be operated to purge EGR in the intake system prior to entering DFSO.

In one example, a method for operating an engine may comprise stopping fuel to a dedicated EGR cylinder group of a multi-cylinder engine in response to a deceleration fuel shut off (DFSO) condition; monitoring an EGR rate after stopping fuel to the dedicated EGR cylinder group; and stopping fuel to each of remaining engine cylinders when the EGR rate is below a threshold rate. The DFSO condition may be based on an engine speed, an accelerator pedal input, and a brake pedal input. The method may further comprise resuming fueling to one or more of the remaining engine cylinders in response to a vehicle operator applying an accelerator pedal. Fueling to the dedicated EGR cylinder group may be resumed after resuming fueling to the remaining engine cylinders. Resuming fueling to the dedicated EGR cylinder group may be based on the engine speed greater than a threshold speed. In some examples, resuming fueling to the dedicated EGR cylinder group may be based on a driver demanded torque.

Further, an intake oxygen concentration may be monitored to determine the EGR rate. In some examples, fueling to the remaining engine cylinders may be stopped when a number of engine revolutions reaches a threshold number, the number of engine revolutions determined after a fuel injector actuator reaches a desired position for stopping fuel to the dedicated EGR cylinder group, and the threshold number based on an engine speed, an engine load, an initial EGR rate, and a throttle position. For example, the speed and the throttle position may determine the air flow through the engine which may be utilized to determine a duration of purge required to consume the intake volume including the EGR mass.

Figure 7:
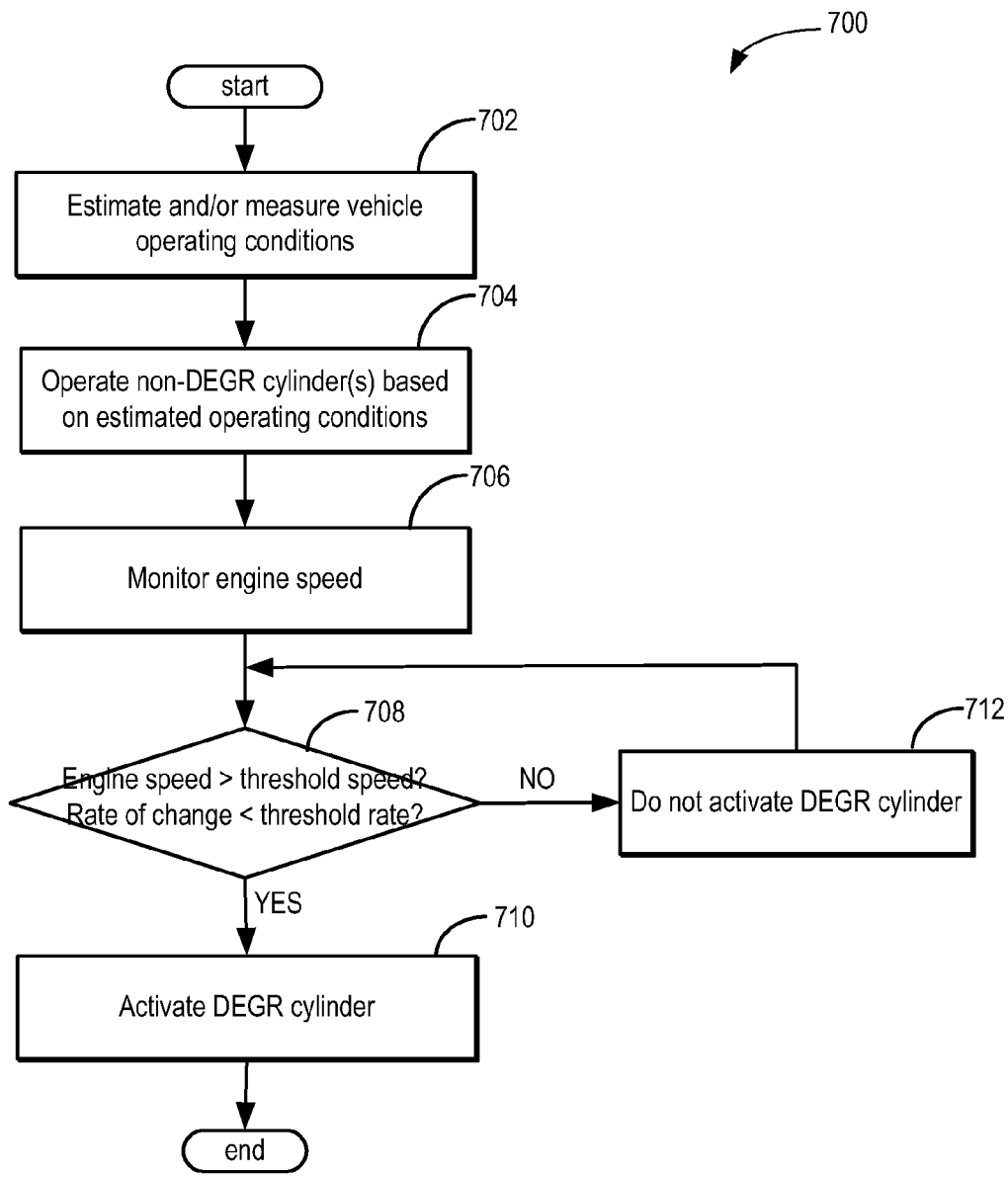
FIG. 7 shows an example method for adjusting engine operation during engine restart conditions, to be used in conjunction with the method of FIG. 4.

Turning to FIG. 7, shows an example method 700 for adjusting engine operation when engine restart is requested.

For example, method 700 may be performed at step 410 of method 400 upon determining that conditions are present to restart the engine automatically. As discussed with respect to FIG. 4, engine restart conditions may be based on accelerator pedal position, brake pedal position, engine speed, vehicle speed, ambient temperature, engine temperature, battery state of charge, etc. For example, an engine restart may be requested via releasing a brake pedal and/or applying an accelerator pedal as well as a change in state of other vehicle conditions. In another example, when the operator applies the accelerator pedal and the desired torque exceeds that which the electric motor can provide, the engine may be restarted to supplement the motor output torque. In still another example, the engine may be restarted during a coasting condition if the battery state of charge drops below a minimum threshold, where the engine is restarted and provides torque to operate the motor as a generator to recharge the battery. In a further example, engine restart conditions may be additionally based on change in status of a traffic control device (such as a change in traffic light to a green traffic light). The method of FIG. 7 may be stored as executable instructions in non-transitory memory of controller 12 shown in FIGS. 1-3.

At 702, method 700 includes estimating and/or measuring vehicle operating conditions. Vehicle operating conditions may include but are not limited to engine speed, accelerator position, throttle position, brake pedal position, vehicle speed, engine temperature, and load. Method 700 proceeds to 704 after determining vehicle operating conditions. At 704, method 700 may include operating non-DEGR cylinders based on the estimated operating conditions and not operating DEGR cylinders. Non-DEGR cylinders may be operated by actuating the valves of the non-DEGR cylinders, and supplying fuel and spark to the non-DEGR cylinders for combustion. In some examples, during a stop-start operation of the engine, when the engine is restarted, the non-DEGR cylinders may be operated such that an engine air-to-fuel ratio is richer than stoichiometry in order to regenerate or activate an exhaust emission control device, such as emission control device 170 at FIG. 1.

Next, At 706, method 700 monitors engine speed during a run-up period (e.g., a time from when engine speed is zero until the engine reaches a stable speed). Further, engine speed may be monitored for a predetermined amount of time after engine speed reaches stable speed during an engine start. Monitoring engine speed may include comparing actual engine speed against a desired engine speed trajectory that is stored in controller memory. Method 700 proceeds to 708 after monitoring engine speed. At 708, method 700 judges whether or not the engine speed is greater than a threshold speed, and whether or not a rate of change of engine speed is less than a threshold change. In other words, method 700 judges if engine speed has reached a stable speed since engine start. Additionally, a driver demanded torque may be utilized to determine if the engine has reached stable operating conditions. In some example, a coolant temperature, an ambient temperature, and a catalyst temperature may be utilized in addition to driver demanded torque and engine speed to determine stable engine operation conditions. If it is determined that the engine speed has reached a stable speed, method 700 may proceed to 710. At 710, method 700 includes activating the DEGR cylinders. In one example, the DEGR cylinders may be activated if the engine speed has reached an idle speed. As such, DEGR cylinders may be activated by actuating the intake/exhaust valves, and supplying fuel and spark to the cylinder for combustion. Fuel to the DEGR cylinders and the non-DEGR cylinders may be adjusted such that the engine air-to-fuel ratio is stoichiometric.

If at 708, it is determined that the engine speed is less than the threshold speed, and rate of change is greater than the threshold change, method 700 may proceed to 712. At 712, the method may continue engine operation with operating non-DEGR cylinders and without operating DEGR cylinders until the engine speed reaches the threshold speed and the rate of change of speed is less than threshold rate. In other words, when it is determined that conditions for engine restart (during cold restarts as well as hot restarts when an exhaust catalyst temperature has reached a light-off temperature) are present, engine may be operated with only non-DEGR cylinders active until engine speed reaches a stable speed.

In an alternate embodiment, all cylinders may be operated at 704, but the DEGR cylinder group valve 65 may be positioned to prevent flow of DEGR exhaust gases to the intake manifold. In this embodiment, "activate DEGR cylinder" at 710 would mean positioning DEGR cylinder group valve 65 to direct flow of DEGR exhaust gases to the intake manifold. Similarly, "do not activate DEGR cylinder" at 712 would mean positioning DEGR cylinder group valve 65 to prevent flow of DEGR exhaust gases to the intake manifold.

In this way, by activating DEGR after the engine speed has reached a stable speed, engine restarts may be improved. In other words, by delaying dilution of the intake air during engine restart, more robust restarts may be achieved.

Figure 8:
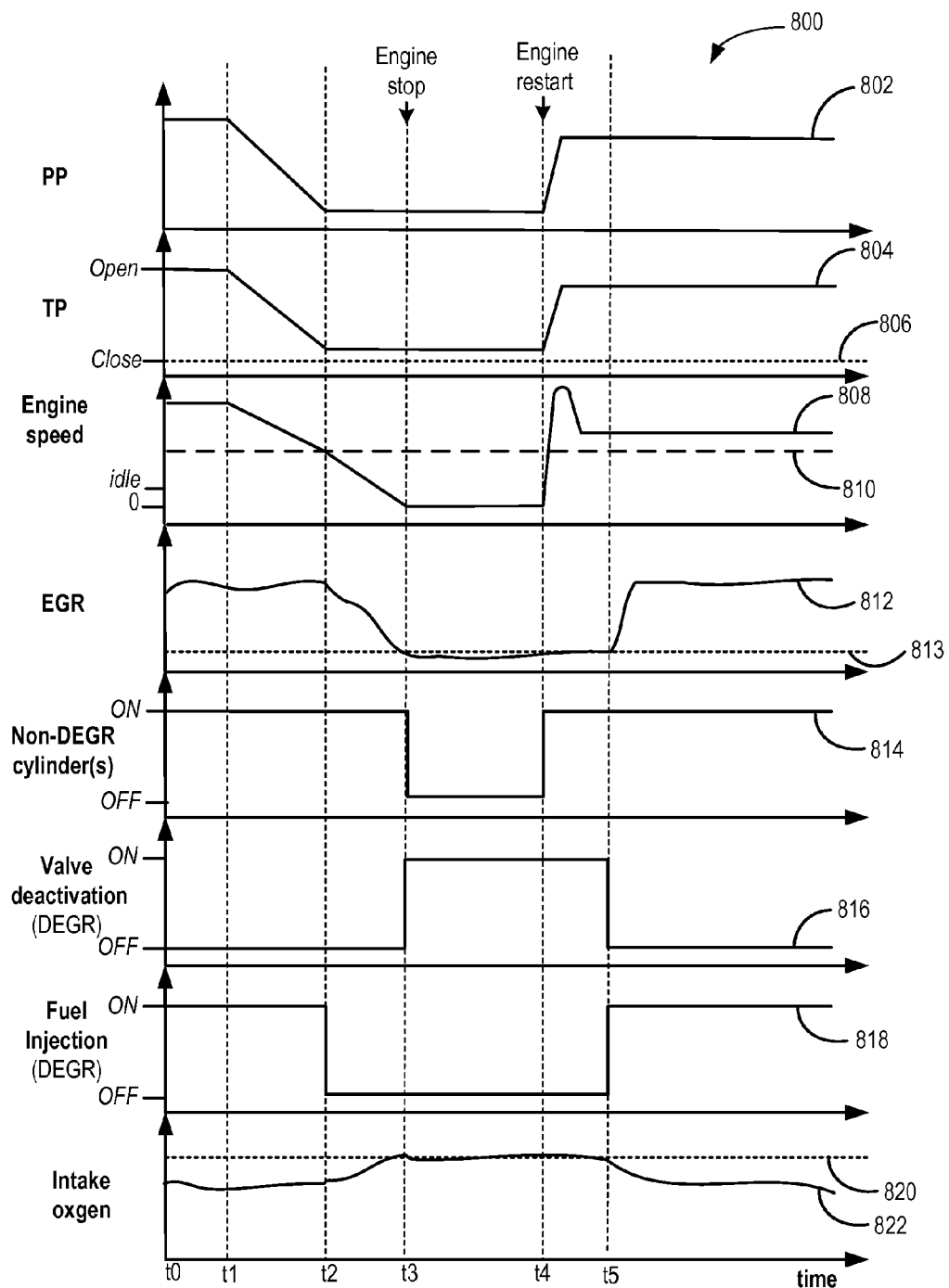
FIG. 8 shows an example map depicting operation of DEGR and non-DEGR cylinders during start-stop operations.

FIG. 8 shows a map 800 depicting an example operation of a DEGR cylinder group, such as the DEGR cylinder group depicted at FIG. 1, and a non-DEGR cylinder group, such as the non-DEGR cylinder group depicted at FIG. 1, to purge EGR from the intake manifold during start-stop operation of a vehicle. The sequence of FIG. 8 may be provided by executing instructions in the system of FIGS. 1-3 according to the methods of FIGS. 4, 5, and 7. Vertical markers at times t0-t5 represent times of interest during the sequence. Specifically map 800 depicts accelerator pedal position at plot 802 and accelerator pedal is applied further in the direction of the Y axis arrow, throttle position at plot 804, engine speed at plot 808 and engine speed increases in the direction of the Y axis arrow, a threshold engine speed at 810, EGR rate at plot 812 and EGR rate increases in the direction of Y axis arrow, a threshold EGR rate at plot 813, a status of operation of non-DEGR cylinders at plot 814, a status of valve deactivation of the DEGR cylinders at plot 816, status of fuel injection to the DEGR cylinders at plot 818, percentage of oxygen at the intake manifold at plot 822, and threshold oxygen percentage at plot 820. All plots are shown over time (along the x-axis).

At time t0, the vehicle may be travelling and the engine may be rotating as indicated by engine speed greater than zero (plot 808). Accelerator pedal is applied (plot 802) and the throttle is opened by an amount corresponding to the accelerator pedal position. The DEGR cylinder group may be operating with fueling (plot 818). As such, spark may be provided to the DEGR cylinder group for combustion of air/fuel mixture. Further, the non-DEGR cylinder group may be operating. The non-DEGR cylinder group may be operated by supplying fuel and spark to the non-DEGR cylinder group. EGR may be supplied (plot 812) at a constant rate by the DEGR cylinders.

At times between t1 and t2, a vehicle operator may begin releasing the accelerator pedal (plot 802). Accordingly, throttle opening decreases (plot 804) and engine speed decreases (plot 808). However, engine speed may be greater than a threshold speed. As a result, the DEGR cylinder group and the non-DEGR cylinder group may be operating. EGR may be supplied by the DEGR cylinder group at a constant rate to the non-DEGR cylinder group.

At time t2, the vehicle operator may release the accelerator pedal and apply brakes to further reduce the speed of the vehicle. For example, the vehicle may be approaching a traffic control device (e.g., traffic signal) and the operator may reduce the speed of the vehicle in order to stop. Accordingly, the engine speed may decrease to the threshold speed and the throttle position may be nearly closed. Based on one or more parameters such as the engine speed below threshold, released accelerator position, and the brake pedal in a depressed position, the vehicle controller may determine that an engine shut-down is imminent. In some examples, the operator may bring the vehicle to a stop (e.g., in response to detecting a traffic control device) and accordingly, an engine shut-down may be requested or initiated. In one example, the controller may receive information from one or more sensors that indicate a status of a traffic control device such as a traffic light and/or a stop sign, and the controller may utilize the status of the traffic control device as an input in addition to accelerator pedal position, brake pedal position, and engine speed to determine if engine shut-down is imminent or requested or initiated. During such conditions, when an engine shut-down is imminent or requested or initiated, fueling to the DEGR cylinder group may be stopped (plot 818) prior to deactivating the non-DEGR cylinder group and shutting down the engine.

Between times t2 and t3, accelerator may continue to be in a released position and the vehicle operator may depress the brake pedal further. Accordingly, the vehicle speed (not shown) and engine speed (plot 808) may continue to decrease. The DEGR cylinder group may be operating without fueling (plot 818) and pumping un-combusted air into the intake manifold. The un-combusted air may purge EGR in the intake manifold and consequently, EGR in the intake manifold may decrease (plot 812). The non-DEGR cylinders may continue to operate with fueling and spark. Further, between t2 and t3, due to un-combusted air replacing EGR in the intake manifold, the intake oxygen concentration may increase.

At t3, EGR in the intake manifold may decrease below the threshold rate (plot 812) and the intake oxygen concentration may reach a threshold concentration indicating EGR is purged from the intake manifold. Upon determining that EGR is at or below the threshold rate and the intake oxygen concentration is at or above the threshold concentration, intake and/or exhaust valves of the DEGR cylinder group may be deactivated in order to fully deactivate the EGR cylinder. Further, the non-DEGR group may be deactivated by stopping fueling and spark to the non-DEGR cylinder group, and additionally by deactivating the intake and/or exhaust valves of the non-DEGR cylinder group if desired. Further at t3, engine may or may not be decoupled from the driving torque of the wheels and may spin down to rest.

In some examples, after stopping fueling to the DEGR cylinder group, a delay counter may be started. The delay counter may be incremented based on one or more of a duration after stopping fuel to the DEGR cylinder group, engine speed, and air flow. Upon the counter reaching a threshold count, intake and/or exhaust valves of the DEGR cylinder group may be deactivated and simultaneously or subsequently, the non-DEGR cylinder group may be deactivated. The threshold count may be based on one or more of initial EGR rate, engine speed, and load.

Between times t3 and t4, engine may be stopped and the non-DEGR cylinder group and the DEGR cylinder group may continue to be deactivated. Further, the vehicle may be stopped.

At t4, the vehicle driver may release the brake pedal and apply the accelerator pedal. Accordingly, an engine restart may be requested. At time t4 and between times t4 and t5, upon engine restart being requested, the non-DEGR cylinder group may be activated first (plot 814). For example, the deactivated valves may be reactivated, and fuel and spark may be supplied to the non-DEGR cylinder group to resume combustion. Accordingly, engine speed may increase and torque may be transferred from the engine to vehicle wheels via the transmission. The DEGR cylinder group may not be activated. Consequently, EGR may be below the threshold rate.

At time t5, the engine may reach a stable speed after restart. Upon reaching the stable engine speed, combustion in the DEGR cylinder group may be restarted by resuming fuel (plot 818) and spark and activating the deactivated valves (plot 816).

In this way, by deactivating the DEGR cylinder group prior to deactivating the non-DEGR cylinder group when the engine shut down operation is anticipated, requested or detected, EGR may be purged from the intake system prior to stopping the engine. As a result, excess intake air dilution during engine restart may be reduced. Further, during engine restart conditions, by activating the non-DEGR cylinder group prior to activating the DEGR cylinder group, and activating the DEGR cylinder group after the engine has completed cranking and has reached the stable speed, restarts may be improved.

Figure 9:
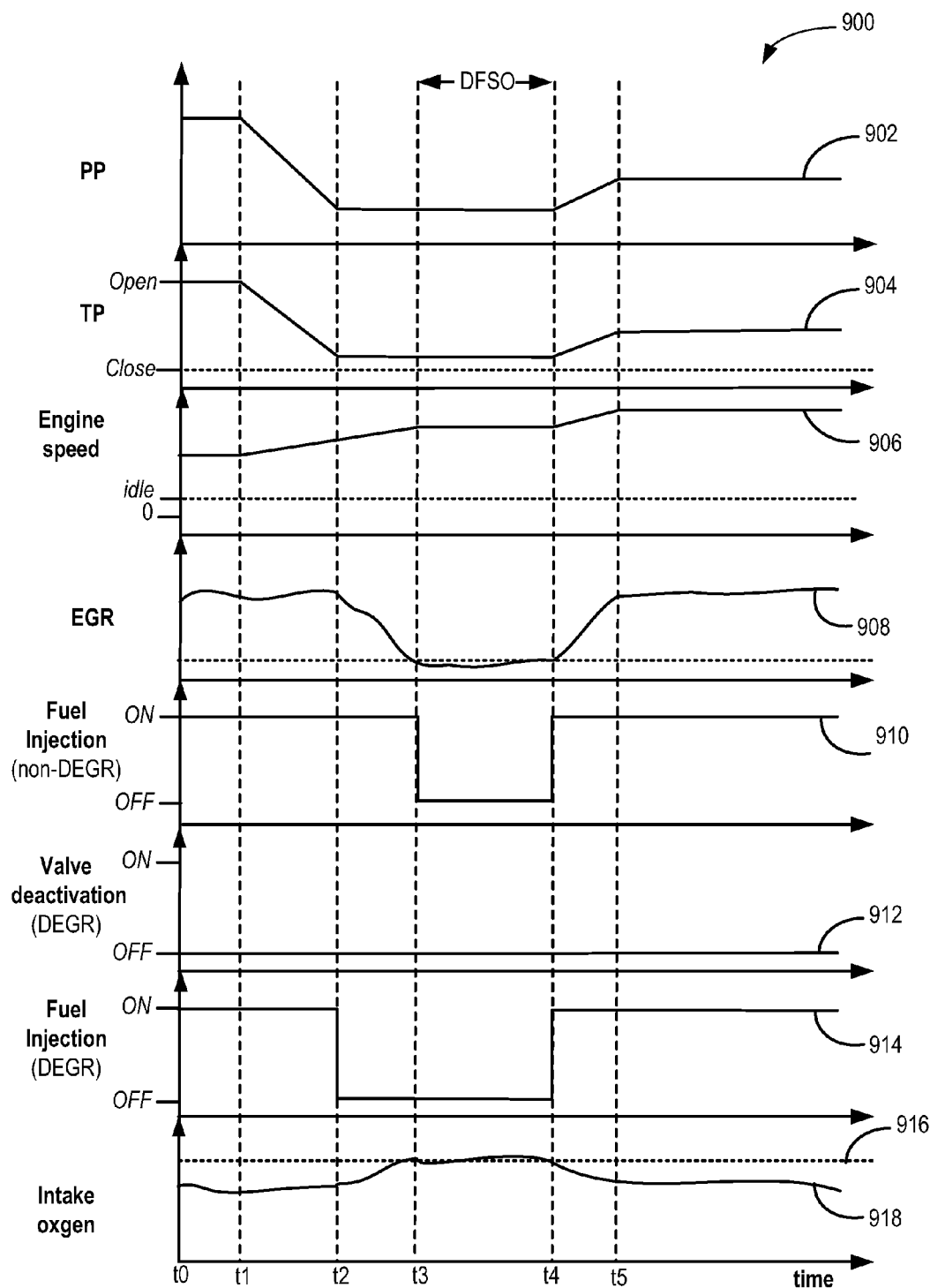
FIG. 9 shows an example map depicting operation of DEGR and non-DEGR cylinders during DFSO conditions.

FIG. 9 shows a map 900 depicting an example operation of DEGR and non-DEGR cylinders to purge EGR from the intake manifold during DFSO operation of a vehicle. The sequence of FIG. 9 may be provided by executing instructions in the system of FIGS. 1-3 according to the methods of FIGS. 4, 6, and 7. FIG. 9 shows eight plots that include similar variables as discussed with regard to FIG. 8. Therefore, for the sake of brevity, the description of variables that are identical is omitted. Plot 910 shows fuel injection at the non-DEGR cylinder group.

At time t0, the vehicle may be travelling and the engine may be rotating as indicated by engine speed greater than zero (plot 906). Accelerator pedal may be applied (plot 902) and the throttle may be opened by an amount corresponding to the accelerator pedal position (904). The DEGR cylinder groups may be operating with fueling (plot 914). Spark may be provided to the DEGR cylinders for combustion of air/fuel mixture. Further, the non-DEGR cylinder groups may be operating (plot 912). The non-DEGR cylinders may be operated by supplying fuel and spark to the non-DEGR cylinders. EGR may be supplied (plot 908) at a constant rate by the DEGR cylinders.

At times between t1 and t2, a vehicle operator may begin releasing the accelerator pedal (plot 902). Accordingly, throttle opening may decrease (plot 904). However, the vehicle may be travelling downhill. Therefore, engine speed may increase (plot 906). EGR may be supplied by the DEGR cylinders at a constant rate.

At time t2, the accelerator pedal may be released and the vehicle may continue to travel downhill. Based on the accelerator pedal position, the throttle position, and the engine speed, the vehicle controller may determine that DFSO conditions are present. Accordingly, prior to initiating DFSO (that is, prior to stopping fueling to the non-DEGR cylinder group) fuel to the DEGR cylinder group may be stopped (plot 914). The non-DEGR cylinders may continue to operate with fueling. As a result, at t2, and between t2 and t3, un-combusted air may be pumped through the intake manifold purging EGR from the intake manifold. Consequently, EGR in the intake manifold may decrease and intake oxygen concentration may increase. However, EGR may be above a threshold rate and intake oxygen may be below a threshold concentration indicating the EGR may not be sufficiently purged from the intake manifold. Therefore, engine may continue to operate without fueling to the DEGR cylinder group (plot 914) and with fueling to the non-DEGR cylinder group (plot 910).

At time t3, EGR in the intake manifold may decrease below a threshold rate and oxygen in the intake manifold may increase above a threshold concentration indicating that EGR is sufficiently purged from the intake manifold. Therefore, DFSO may be initiated by stopping fueling to the non-DEGR cylinder group (plot 910).

Between times t3 and t4, engine may be rotating at a constant speed with accelerator pedal released. Therefore, the DFSO operation may be maintained. That is, fueling to the DEGR and the non-DEGR cylinder groups may be stopped.

Next, at time t4, and between t4 and t5, the vehicle operator may apply the accelerator pedal requesting torque from the engine. Therefore, engine operation may exit from DFSO by resuming fueling to the non-DEGR cylinder group and the DEGR cylinder group. Consequently, EGR may be supplied by the DEGR cylinder group and EGR rate may increase. At time t5 and beyond, the engine may operate with fueling and spark to the DEGR and the non-DEGR cylinder groups.

In one example, during exit from DFSO operation, if the engine speed during DFSO is below a threshold speed, fueling to the non-DEGR cylinders may be resumed first. Subsequently, upon the engine speed increasing above the threshold speed, fueling to the DEGR cylinder group may be resumed.

In this way, during DFSO conditions, fueling to the EGR cylinder group may be stopped prior to stopping fueling to the non-DEGR cylinder group in order to purge EGR from the intake system.

Taken together, during start-stop and DFSO operations, by deactivating or stopping fueling to the DEGR cylinder group prior to deactivating or stopping fueling to the non-DEGR cylinder group, EGR may be purged from the intake system. Further, during engine restart operations, the non-DEGR cylinder group may be reactivated prior to reactivating the DEGR cylinder group. In this way, excess intake air dilution during engine restart and refueling operations may be reduced. Consequently, robust and repeatable engine starts may be achieved in an engine with DEGR system.

In one example, a method for operating an engine may comprise: during a first condition, deactivating a dedicated EGR cylinder group of a multi-cylinder engine in response to an imminent engine shutdown condition, and shutting down the engine only after purging at least a threshold amount of exhaust from the dedicated EGR cylinder group to the intake; and during a second condition, concurrently deactivating the dedicated EGR cylinder group and other cylinders of a multi-cylinder engine in response to the imminent engine shutdown condition, and blocking flow from the dedicated EGR cylinder group to the intake.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
deactivating a dedicated EGR (DEGR) cylinder group of a multi-cylinder engine in response to an imminent engine shutdown condition and prior to deactivating a non-DEGR cylinder group to purge EGR from an intake system;
monitoring an EGR amount after deactivating; and
deactivating the non-DEGR cylinder group and shutting down the engine in response to the monitored EGR amount falling below a threshold.

2. The method of claim 1, wherein shutting down the engine includes stopping spark and fuel, and wherein while deactivating the DEGR cylinder group and not fueling the DEGR cylinder group, the engine continues to operate with fueling to the non-DEGR cylinder group.

3. The method of claim 2, further comprising deactivating each cylinder of the non-DEGR cylinder group in response to a monitored oxygen above the threshold.

4. The method of claim 3, further comprising in response to an engine restart, reactivating one or more of the non-DEGR cylinders, while not reactivating the DEGR cylinder group.

5. The method of claim 4, further comprising reactivating the DEGR cylinder group after the engine restart when an engine speed has reached an idle speed and a threshold load.

6. The method of claim 1, wherein deactivating the DEGR cylinder group includes stopping fuel to the DEGR cylinder group and deactivating one or more of an intake valve and an exhaust valve of the DEGR cylinder group.

7. The method of claim 6, wherein stopping fuel to the DEGR cylinder group is performed before deactivating the one or more valves of the DEGR cylinder group.

8. The method of claim 3, wherein deactivating each cylinder of the non-DEGR cylinder group includes stopping fuel to each cylinder of the non-DEGR cylinder group and deactivating one or more of an intake valve and an exhaust valve of each cylinder of the non-DEGR cylinder group.

9. The method of claim 1, wherein the EGR amount is based on an intake oxygen amount, the intake oxygen amount determined based on an intake oxygen sensor measurement, and wherein the DEGR cylinder group is a sole source of EGR to the engine, and wherein EGR is provided to the non-DEGR cylinder group solely via exhaust flow from the DEGR cylinder group.

10. The method of claim 1, wherein the imminent shutdown condition is based on one or more of an accelerator pedal position, a brake pedal position, an engine speed, a vehicle speed, an engine temperature, and a battery state of charge, and further based on an engine speed below a threshold speed, throttle position, and an intake pressure.

11. A method for operating an engine, comprising:
   stopping fuel to a dedicated EGR (DEGR) cylinder group of a multi-cylinder engine in response to a deceleration fuel shut off (DFSO) condition while continuing fueling to a non-DEGR cylinder group;
   monitoring an EGR rate after stopping fuel to the DEGR cylinder group; and
   stopping fuel to each cylinder of the non-DEGR cylinder group responsive to the EGR rate below a threshold rate, wherein EGR is provided to the non-DEGR cylinder group solely via exhaust flow from the DEGR cylinder group.

12. The method of claim 11, wherein the DFSO condition is based on an engine speed, an accelerator pedal input, and a brake pedal input.

13. The method of claim 12, further comprising resuming fueling to the non-DEGR cylinder group in response to a vehicle operator applying an accelerator pedal, and further based on an engine speed greater than a threshold speed.

14. The method of claim 13, further comprising resuming fueling to the DEGR cylinder group after resuming fueling to the non-DEGR cylinder group.

15. The method of claim 14, wherein resuming fueling to the DEGR cylinder group is based on the engine speed greater than the threshold speed and further based on one or more of a driver demanded torque, and an engine load.

16. The method of claim 11, further comprising monitoring an intake oxygen concentration to determine the EGR rate.

17. The method of claim 11, further comprising stopping fueling to the non-DEGR cylinder group when a number of engine revolutions reaches a threshold number, the number of engine revolutions determined after a fuel injector actuator reaches a desired position for stopping fuel to the DEGR cylinder group, and the threshold number based on an engine speed, an engine load, and an initial EGR rate.

18. A method for operating an engine, comprising:
   during a first condition deactivating a dedicated EGR (DEGR) cylinder and deactivating each cylinder of a non-DEGR cylinder group after a first duration after deactivating the DEGR cylinder; and
   during a second condition stopping fuel to the DEGR cylinder and stopping fuel to each cylinder of the non-DEGR cylinder group after a second duration after stopping fuel to the DEGR cylinder.

19. The method of claim 18, wherein the first duration and the second duration are based on an engine speed, an engine load, and an initial EGR rate, the engine load based on a throttle position and a manifold air pressure.

20. The method of claim 19, wherein the first condition is an engine shutdown condition, and the second condition is a DFSO condition.

21. A method for operating an engine, comprising:
   during a first condition, deactivating fuel injection to a dedicated EGR cylinder group of a multi-cylinder engine in response to an imminent engine shutdown condition while continuing fuel injection to a non-dedicated EGR cylinder group, and shutting down the engine, including the non-dedicated EGR cylinder group, only after purging at least a threshold amount of exhaust from the dedicated EGR cylinder group to an intake; and
   during a second condition, concurrently deactivating the dedicated EGR cylinder group and the non-dedicated EGR cylinder group of the multi-cylinder engine in response to the imminent engine shutdown condition, and blocking flow from the dedicated EGR cylinder group to the intake.

* * * * *